UNITED STATES PATENT OFFICE.

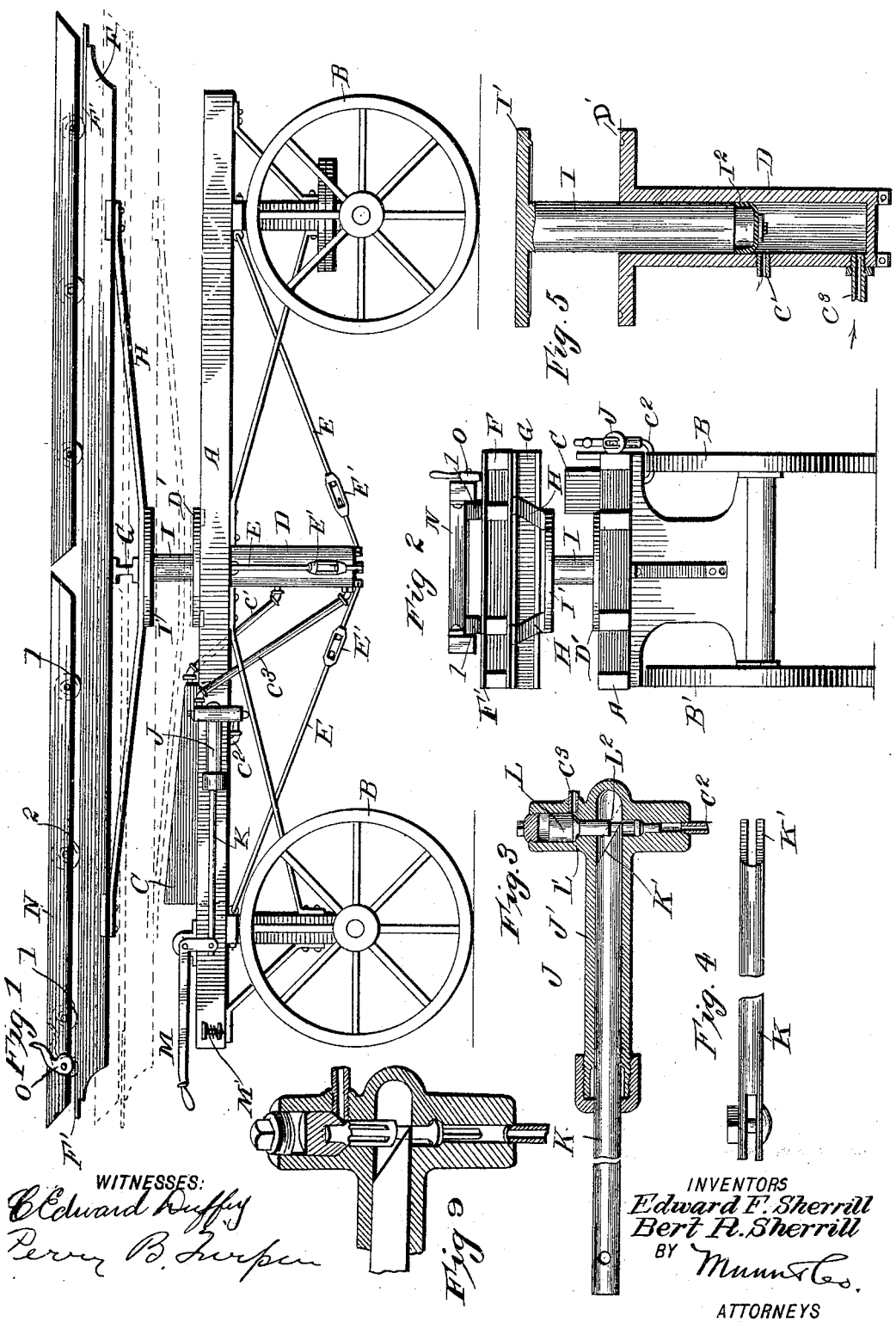

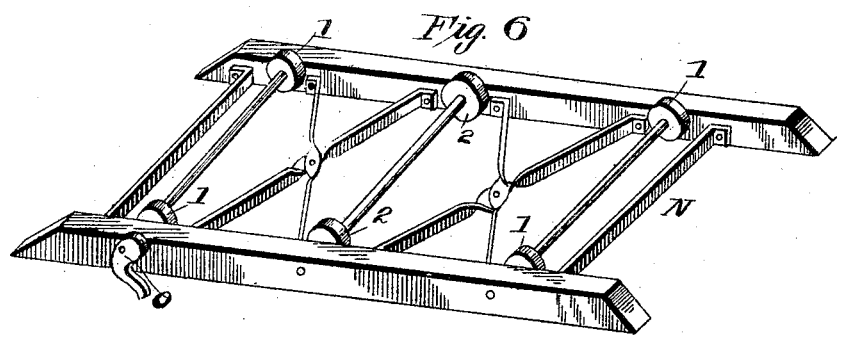
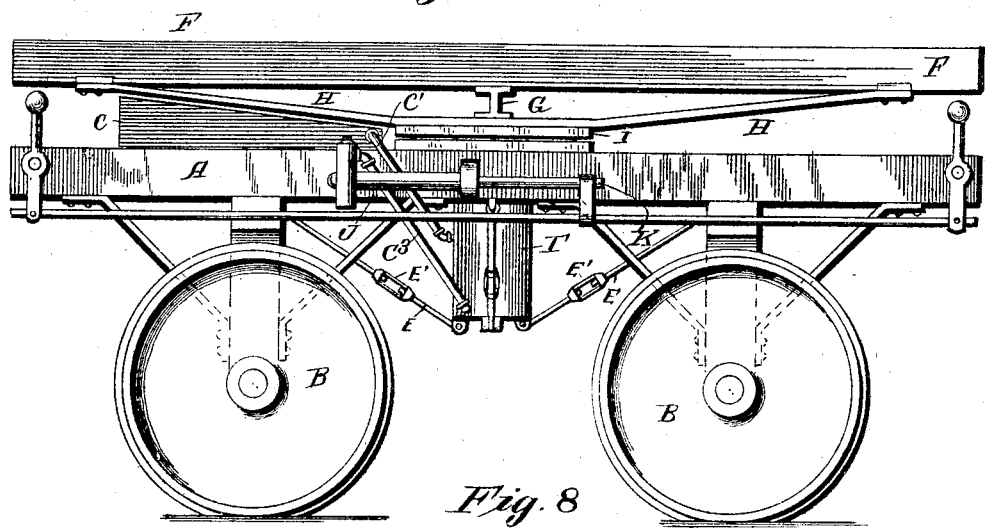
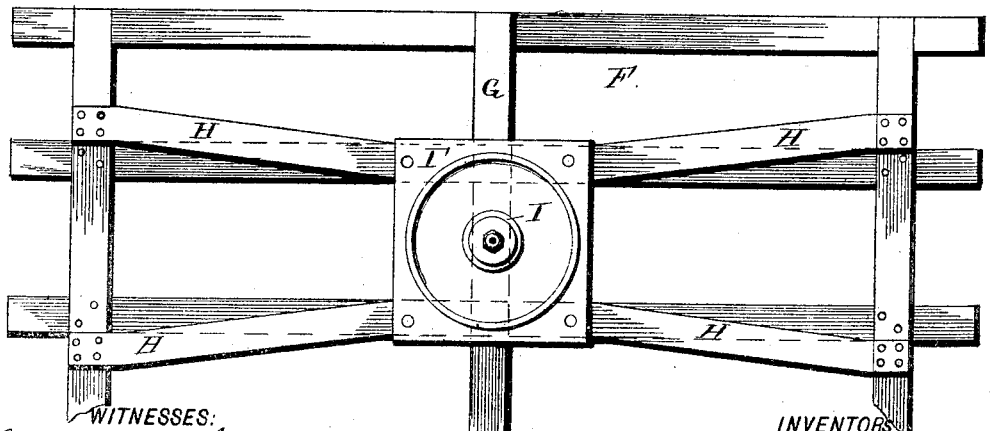

EDWARD FREEMAN SHERRILL AND BERT RHODES SHERRILL, OF MOLINE, ILLINOIS.

TRUCK.

No. 804,060.  Specification of Letters Patent.  Patented Nov. 7, 1905.

Application filed May 27, 1904. Serial No. 210,069.

*To all whom it may concern:*

Be it known that we, EDWARD FREEMAN SHERRILL and BERT RHODES SHERRILL, citizens of the United States, residing at Moline, in the county of Rock Island and State of Illinois, have made certain new and useful Improvements in Trucks, of which the following is a specification.

This invention is an improvement in trucks, and especially in that class of trucks designed for use in handling baggage, bricks, and the like, wherein it is desired to raise the articles to a higher level in some instances and to lower them from a higher level in other instances; and the invention consists in certain novel constructions and combinations of parts, as will be hereinafter described and claimed.

In the drawings, Figure 1 is a side elevation of a truck embodying our invention and adapted for use in handling baggage, such as trunks, &c. Fig. 2 is an end elevation of the truck shown in Fig. 1. Fig. 3 is a vertical longitudinal section of the pump shown in Fig. 1. Fig. 4 is a detail top plan view of the plunger employed in the pump shown in Fig. 3. Fig. 5 is a detail vertical section of the cylinder and piston for hoisting the movable platform. Fig. 6 is a detail perspective view from the under side of one of the dollies. Fig. 7 is a side elevation of a truck adapted for use in handling bricks. Fig. 8 is a detail bottom plan view, partly broken away, of the bed-frame of the truck shown in Fig. 1; and Fig. 9 is a detail view illustrating the valve and piston of the hydraulic-pressure device.

By our invention we provide a truck comprising a carriage having a cylinder and means for producing hydraulic pressure in said cylinder and a platform having a depending piston operating in said cylinder and adapted to be raised and lowered by the hydrostatic pressure exerted in the cylinder by the pump, presently described. The truck when so formed may be constructed and adapted for use in handling baggage, such as trunks and the like, and in such case may be provided with dollies (shown in Figs. 1, 2, and 6) and having rollers, so they may serve as trucks in manipulating the baggage in the baggage-cars and upon platforms, as well as in loading the baggage onto and moving it off the vertically-movable platform of the truck, or the truck may be made as shown in Fig. 7 and bricks be supplied directly on the movable platform shown in the said figure and which will be more fully described hereinafter.

Referring now to the constructions shown in Figs. 1 and 2 and in detail in some of the other figures, it will be noticed that the truck has a bed-frame A mounted on wheels B and supplied with a tank C for holding the liquid and with a cylinder D, depending from the bed A, open at its upper end, having at such end a flange or cap-plate D', which rests upon the bed A, being braced at its lower end by means of rods E, having turnbuckles E' and suitably connecting the lower end of the cylinder D with the bed-platform, as best shown in Fig. 1 of the drawings. By this construction the cylinder D is firmly braced in position and is adapted to sustain the strains incident to the operation of the movable platform, which will be presently described. The platform F is provided at its ends with the projecting plates F', which may lap upon the step of a car-door in the use of the invention and is provided on its under side with a cross-beam G of I form, from which extend strut-braces H toward the ends of the platform, and below this cross-beam G and the braces H is secured the cap or top plate I' of the piston I, which piston I operates in the open upper end of the cylinder D, is suitably packed at its lower end at $I^2$ by a sole-leather cap, and is arranged to be forced upward by hydraulic pressure operating beneath the piston I until the piston reaches its uppermost operative position, such as shown in Fig. 5 of the drawings. The tank C is carried by the bed-frame A and has connected with it a return-pipe C', which connects with the cylinder D at a point corresponding to the highest point to which it is desired to force the piston I. A supply-pipe $C^2$ leads from the tank C to the pump J and supplies the pump with liquid from the tank C, the pump forcing the liquid by its operation through a pipe $C^3$ to the bottom of the cylinder D when it is desired to lift the piston I and the platform which such piston carries in the operation of the invention. The pump J has a cylinder J', in which operates the plunger K in such manner as to force the liquid supplied to the cylinder J' through the pipe $C^2$ out through the pipe $C^3$ into the cylinder D to raise the piston I. The pump J also has a valve-chamber in which operates a valve L, which seats at L' and is provided at L² with a shoulder against which operates the inclined end K' of the plunger K when it is desired to hold the valve L open in order that the pressure may equalize in the tank C and the cylinder D when it is desired to lower the platform F, as will be more fully described hereinafter. The plunger K is connected with and operated by the lever M, whose handle-arm is stopped normally by the upper end of a spring-cushion M' in such manner as to limit the stroke of the lever to the ordinary pumping operation. When, however, it is desired to hold the valve L open to permit the pressure to equalize and the platform F to lower by its gravity, the handle of the pumping-lever is forced down against its cushion beyond its normal stopping position, and the inclined end K' of the plunger will raise the valve L, so that the pressure may pass back through the pipe C³ and through the pump to the tank to equalize as desired. In operation, when it is desired to raise the platform F, it is only necessary to operate the pump by the handle M in such manner as to force pressure through the pipe C³ to the lower end of the cylinder D, when the piston and its platform may be raised to the position shown in Fig. 5 or to any position between that and the lowermost position of the piston. If it is desired to lower the platform, it is only necessary to move the plunger K to the dotted-line position, (shown in Fig. 3,) when the pressure may pass back to the tank and the platform may lower by its gravity. In the operation of this construction it will be understood that the upper valve should be fluted or ground down, leaving a sufficient guide to work in, and the lower valve should also be fluted or squared sufficiently to leave a guide, so that it will work loosely, and in operation, as the straight end of the piston is drawn back from the position shown in Fig. 3, the suction will raise the lower valve and the space in the cylinder will be filled with fluid. Then when the piston is forced back toward the position shown in Fig. 3 the lower valve will be forced to its seat and prevent the fluid from passing back to the supply-tank and the piston will force the upper valve up and the fluid will be driven to the bottom of the large cylinder and raise the piston and platform, this being done by the operating stroke. Then in order to lower the piston and platform of the car the piston K is moved farther to the right from the position shown in Fig. 3, causing the inclined end of such piston to raise both the upper and lower valves from their seats, when the weight of the piston and platform of the car will force the liquid through the pipe C³ back through the cylinder and through the outlet C² into the tank, and the platform of the car may be lowered to any desired extent or stopped in any position required by simply pulling the point of the split inclined end of the piston K back to its normal position. To permit this operation, it will be understood that the upper valve slides upon the upper end of the valve-rod, as will be understood from the detail view Fig. 9.

The dollies shown in Fig. 1 are in the form of flat platforms provided with three sets of wheels, the end wheels 1 being slightly smaller than the middle wheels 2. The rollers of the end sets are usually fixed to their axles, while the rollers of the middle and larger set may be loose on their axle to permit the dolly to be easily turned. As shown, two of these dollies may be loaded on the platform F and may be easily rolled on or off said platform, as desired. We prefer to provide the dollies N with brakes O in the form of pivoted cams, which may be turned up to the position shown in Fig. 1 or may be turned to the dotted-line position, so that by the pressure of the foot or hand the cam of the brake may be caused to bear upon the floor or platform to hold the dolly from running in either direction.

The bed-frame, the movable platform, and the dolly-frames may be made of steel, iron, wood, or other materials or combination of materials, and may be suitably braced in the manner described to secure the desired strength in the use of the invention.

In Fig. 7 we show a side elevation of a truck adapted for use in handling bricks in brickyards and the like. This truck embodies features shown also in Fig. 1 and fully described heretofore, some slight changes in the bracing of the parts and in the construction and arrangement of the pump being employed in the construction shown in Fig. 7—such, for instance, as arranging for operating the pump from either or both ends of the bed-frame, as well as having slight rearrangement of the wheels supporting the bed-frame in order to produce a more compact and a stronger construction, better suited for the special purpose for which the truck may be employed.

In using the improved adjustable truck-hoist and dollies it will be found desirable to employ a system in transferring express-baggage which experience and practice prove desirable. The dollies may be made in any desired lengths, and when used on four-wheel trucks two dollies may be employed on one of the platforms. In a system employing the improvements the baggage and express cars should be equipped with two or more dollies in starting on a trip, and the transfer depots and junctions should have at least two trucks with a corresponding number of dollies, so that an empty truck may receive the load from the car first, and when trunks, baggage, or express has been loaded on the dollies, it may be moved from the truck into the car and that in the car be moved onto the truck without requiring the removal of the baggage from the dollies, the latter being shifted to proper position in the car and then manipulated to discharge the baggage at the desired points. In some instances at small stations the baggage to be loaded into a car may be placed on one end of the platform and the empty end of the platform adjusted to the car to receive the baggage therefrom, after which the platform may be turned to deliver its baggage to the car, or the truck can be run alongside the car and receive and discharge the load in such manner as may prove desirable to the operators. Furthermore, in stations or junctions where several trains arrive and depart at the same time a temporary platform may be provided to which the brakeman can run his truck and run the loaded surplus of baggage or express on said platform until there is room to load it on the car. It will also be understood that at small stations where way freight is unloaded on the platform of the depot one of the improved trucks may be run alongside the freight-car, the door of the latter being open, when by turning the platform or bridge just at the right time, when the truck is stopped in front of the car-door, the bridge or platform of the truck can be made to project at one end nearly to the middle of the car, and this can be done with the truck loaded or empty, so that there will be a saving of both time and labor in manipulating way freight by means of the truck.

Having thus described our invention, what we claim as new, and desire to secure by Letters Patent, is—

1. The improvement in trucks herein described, comprising the bed-frame, its wheels, the cylinder having at its upper end a flange or cap-plate resting on the bed-frame, said cylinder being open at its upper end, the platform having on its under side a depending piston operating in the cylinder of the bed-frame, the dollies mounted on said platform, the liquid-tank supported on the bed-frame, a return-pipe connected with the cylinder midway between its ends and leading to said liquid-tank, the pump, the supply-pipe extending from the pump to the cylinder and opening into the latter at or near its lower end, the feed-pipe leading from the tank to the pump, the valve in the pump and arranged for operation by the plunger, the plunger having an inclined end arranged when moved beyond its normal stroke to operate the valve, and the lever for operating the plunger, substantially as and for the purposes set forth.

2. A truck substantially as herein described, comprising a bed-frame, a cylinder supported thereby and open at its upper end, devices for bracing said cylinder from the bed-frame, a feed-pipe leading to said cylinder, a return-pipe leading from the cylinder to a liquid-tank, the tank and a pump and connections between the liquid-tank and the feed-pipe which leads to the cylinder, and a platform having a piston operating in the cylinder of the bed-frame, substantially as and for the purposes set forth.

3. The combination of the bed-frame, the cylinder, the tank for supplying liquid to the cylinder, the platform having a piston operating in the cylinder, the pump having a plunger, connections between the pump and the tank and the cylinder, and a valve in the pump and arranged for operation by its plunger, substantially as set forth.

4. The combination of the bed-frame, the cylinder carried thereby, means for establishing pressure in the cylinder, rods bracing the cylinder from the bed-frame, the platform, a cross-beam beneath the platform, brace-rods extending between said cross-beam and the platform, and the piston operating in the cylinder of the bed-frame and having its cap-plate secured beneath the cross-beam of the platform, substantially as set forth.

5. The combination in a truck with the bed-frame and its cylinder, of means for using hydrostatic pressure in the cylinder, means for bracing the cylinder from the bed-frame, the platform arranged above the bed-frame, and having a piston operating in the cylinder thereof, and end plates projecting from the platform and to lap upon the step of a car-door, substantially as set forth.

6. A dolly comprising a platform, end wheels, intermediate wheels larger than the end wheels, and a brake consisting of a cam pivoted to the dolly and adapted to be turned to bear against the support against which the dolly rests, substantially as described.

EDWARD FREEMAN SHERRILL.
BERT RHODES SHERRILL.

Witnesses:
E. M. MITCHELL,
A. G. SWANSON.